UNITED STATES PATENT OFFICE 2,013,074

ORGANIC COLORING MATERIAL COMPRISING AN AZO COMPOUND AND OXIDIZED ROSIN AS A SUBSTRATUM

Alfred Siegel, Hillside, N. J., assignor to Krebs Pigment & Color Corporation, Newark, N. J., a corporation of Delaware No Drawing. Application October 16, 1933, Serial No. 693,822

6 Claims. (Cl. 134—58.5)

The present invention comprises novel azo lakes and pigments in which the azo compound is associated with a substratum comprising oxidized rosin and processes of making the same.

Oxidized rosin is obtained from natural, abietic acid containing rosin and differs from the original rosin in its chemical and physical characteristics of which its solubility in toluol is the most characteristic property.

I have, jointly with E. R. Allen, shown in U. S. Patent Re. 18,590 that the development of azo lakes and pigments in the presence of metallic rosinates produces novel products in which the rosinate acts as a non-diluting substratum and that the novel lakes are distinguished by bright, clear tones which are non-bronzing when the lakes are used in printing inks.

I have found that the chemically and physically different oxidized rosins act in a manner similar to natural rosin when the development of the lake takes place in the presence of an oxidized rosin compound, which then acts as a substratum for the azo compound.

The process of my invention comprises, therefore, developing by heating an aqueous suspension of an insoluble azo coloring compound or salt in the presence of an insoluble salt, or soap of an oxidized rosin.

By the term development I refer to that step of the process of making azo lakes and pigments where an insoluble azo coloring compound is heated in aqueous suspension with a substratum. During this operation some physical and chemical changes take place, the azo compound combines with the substratum and the full tinctorial value of the pigment is obtained.

The suspension of the azo compound and the substratum can be prepared in any desired manner.

I can, for instance, add a soluble oxidized rosin soap to either the diazo compound or to the coupling compound and effect the coupling reaction and then precipitate insoluble salts of the two; such a suspension can be developed directly, or I can filter the two insoluble compounds, make an aqueous slurry therefrom and heat this, for instance to boiling temperature until development has taken place. I can also prepare separately the azo compound and the soluble oxidized rosin soap and precipitate separately or jointly the insoluble salts of the two and obtain therefrom a joint suspension, which is then heated to effect development or I can prepare such a suspension in any other manner which will be obvious to those skilled in the art.

The insoluble oxidized rosin salts are produced by the reaction of their soluble alkali metal salts with alkaline earth metal and heavy metal salts; barium, calcium, aluminum, zinc, etc. salts are preferred in the preparation of my suspensions for use in the development of the lakes and pigments. Similarly when using salt-forming azo compounds I preferably use their insoluble alkaline earth and heavy metal salts.

The development can be carried out in neutral solution but in most cases I prefer to have free alkali present in the suspension to obtain the full value of the improvements due to the formation of a lake or pigment which contains an oxidized rosin as the substratum. It is in many instances advisable to add to the suspension a soluble dispersing agent which facilitates the combination of the two insoluble materials. Soaps, sulfonated vegetable oils, such as sulfonated castor oil or Turkey red oil, sulfonated cotton seed oil, sulfonated fish oil, etc. are quite useful for this purpose.

My invention is applicable to various azo dyestuffs of the following three types which are capable of being transformed into pigments.

*Mono-azo monosulfonic acids.*—The sulfonic acid group is usually and preferably located in the first, or diazo component. These toners are more or less soluble in the form of their free acids or alkali metal salts and are rendered insoluble by treatment with an alkaline earth or heavy metal salt. Instances of such combinations are the compounds formed by coupling 1. Diazotized 2-naphthylamine 1-sulfonic acid with beta naphthol (Lithol red, Colour Index No. 189).

2. Diazotized para-nitraniline ortho-sulfonic acid with beta naphthol (Lake red P, Colour Index No. 158).

3. Diazotized 2-naphthylamine 1-sulfonic acid with salicylic acid.

4. Diazotized para-toluidine metasulfonic acid with the anilide of beta oxynaphthoic acid.

*Mono-azo monocarboxylic acids.*—The carboxylic acid group may be in either component and the component not containing the carboxylic group may or may not contain a sulfonic acid group. These toners are more or less soluble as their free acids or alkali metal salts and are rendered insoluble by treatment with an alkaline earth or heavy metal salt. For example, such toners can be formed by coupling 1. Diazotized para-toluidine metasulfonic acid with beta oxynaphthoic acid (Lithol rubine, Colour Index No. 163).

2. Diazotized para-nitro ortho-toluidine with beta oxynaphthoic acid.

3. Diazotized anthranilic acid with beta naphthol (Lake red D, Colour Index No. 214).

4. Diazotized 2-naphthylamine 1-sulfonic acid with beta oxynaphthoic acid. (Lake Bordeaux B, Colour Index No. 190.)

*Azo pigment dyestuffs.*—This type of toner is a substantially insoluble dyestuff produced in the coupling itself and does not contain salt-forming groups. The following illustrative cases are formed by coupling 1. Diazotized para-nitro-aniline with beta naphthol (Para red, Colour Index No. 44).

2. Diazotized meta-nitro para-toluidine with aceto-acetanilide (Hansa yellow G).

3. Diazotized para-nitro ortho-toluidine with beta naphthol (Pigment orange R, Colour Index No. 68).

4. Diazotized alpha-naphthylamine with beta naphthol (Autol red RL, Colour Index No. 82).

For convenience's sake and to follow commercial and industrial practice I use the term beta-oxynaphthoic acid herein to designate the 2.hydroxynaphthalene-3.carboxylic acid.

For the purpose of this invention and in accordance with commercial practice, a "toner" is defined as an organic pigment which may or may not contain salt-forming groups and which is not associated with a substratum or extender; and a "lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc. or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine metasulfonic acid with beta oxynaphthoic acid may be used as such (toner form) or may be extended with a substratum consisting of alumina hydrate and blanc fixe (lake form). For use as a rubber pigment, it has been found that the lake form has definite advantages over the toner in respect to (a) greater strength for the same dyestuff content, (b) reduction of the tendency to crock, and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap Para reds (so-called Grinder's reds) a substratum is an aid in the grinding of the paint. In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplification in the manufacture of the ink.

The present invention relates to the lakes which contain a substratum, and they can be obtained from the toner type of azo compounds as well as from the azo compound which only by association with a substratum become a pigment, or lake, in both instances the azo compound is substantially water insoluble before developing or becomes so during development.

The products of the present invention combine to a certain extent the color strength and properties of a toner with the properties usually found in a lake formed with an inorganic substratum.

The amount of oxidized rosin substratum for use in my novel lakes and pigments can vary within wide limits. Small amounts, say for instance 5% of the oxidized rosin compound in the finished product, produces already a noticeable improvement in the tinctorial properties of the lake. Up to about 50% of the finished product the oxidized rosin substratum does in many instances produce pigments of substantially the same color value as a substratum free pigment while a much greater weight yield is obtained, the oxidized rosin compound in such cases acting as a non-diluting substratum.

My novel azo lakes and pigments are characterized chemically by containing as the substratum a water insoluble oxidized rosin salt. They have a brighter and cleaner tone and are of a greater tinctorial strength than the azo color per se or similar pigments made with an inorganic substratum.

The following are a few examples of how I produced my novel lakes and pigments and the products themselves.

It will be understood that my invention is not limited to these examples or to the individual manipulation steps disclosed therein. Similar results are also obtained with other azo compounds which are capable of forming lakes and pigments by development in the presence of a substratum; similar results are also obtained by precipitating the insoluble azo compound and the oxidized rosin salt with other alkaline earth metal, or heavy metal salts.

*Example I.*—A solution of the sodium salt of a 2-naphthylamine 1-sulfonic acid corresponding to 11.5 parts of the free acid, is diazotized in the usual manner with 39 parts of sodium nitrite and 204 parts of muriatic acid 20° Bé. In a separate container a solution of 80 parts of beta naphthol and 51 parts of caustic soda is prepared and made to a volume corresponding to approximately 2500 parts of water. After the temperature of this solution has been adjusted to 25° C., the diazo suspension referred to above, is introduced into the beta naphthol solution. The coupling proceeds rapidly and to good completion. It is evident from the amounts of ingredients stated above, that the azo reaction is completed in an alkaline condition. The charge is then heated to 40° C.

To a solution of 30 parts of caustic soda in 325 parts of water is added 75 parts of oxidized rosin. The volume is then brought to the equivalent of approximately 1900 parts of water, the preparation boiled to complete the saponification. This preparation of oxidized rosin soap is then run into the charge of the azo dystuff, described above, and the temperature and volume of the combining solutions so adjusted that the temperature of the resulting charge does not drop below 40° C.

The charge is then precipitated with a solution of 240 parts of barium chloride in 5,000 parts of water at the boil, boiled to insure development of the lake, and the product then washed, filtered, dried and ground in the usual manner.

The yield is approximately 280 parts of dry product compared to 245 parts in a charge prepared without oxidized rosin soap. The difference represents the substratum in the lake. The oxidized rosin lake is equal in covering power (determined by tinting in white) to the product obtained without the use of oxidized rosin soap, and is equal in this respect to the ordinary commercial barium lithol toner.

It is much brighter in shade and cleaner in tone, and when ground into litho varnish to produce a printing ink, the latter gives prints which possess a bright, fiery, bronze-free tone. In other words, this new product possesses the strength of a toner and the printing qualities of a lake.

*Example II.*—A solution of 41.8 parts of the sodium salt of para-toluidine metasulfonic acid ($CH_3:SO_3:NH_2=1:3:4$) is diazotized with 14.4 parts of nitrite of soda and 52 parts of 20° Bé. muriatic acid.

40 parts of beta oxynaphthoic acid $$(OH:COOH=2:3)$$

are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to a good completion. After stirring a short time the dyestuff is filtered.

The soda salt dye paste is then re-slurried to 16,800 parts of water at 40° C. To this are added 9.6 parts of para soap in 50 parts of water. In a separate container 32 parts of oxidized rosin are in 400 parts of water, and the solution boiled until the formation of the soluble oxidized rosin soap is complete. This oxidized rosin soap solution is then added to the dye solution and the temperature adjusted to 40° C. and stirred 15 minutes.

In a separate container 80 parts of calcium chloride are dissolved in 2000 parts of water and the temperature adjusted to 27° C. and into this is then run in 10 minutes the dye soap solution. There is then added 41 parts of caustic soda in 500 parts of water and the slurry stirred for 15 minutes. The charge is then heated to the boil and digested at this temperature for ½ hour, after which it is washed, filtered and dried in the usual manner.

The yield is approximately 127 parts of pigment compared with 92 parts in a charge carried out in exactly the same way but without the oxidized rosin. The lake pigment contains about 28% of the calcium salt of oxidized rosin as a substratum, and is equal in covering power (determined by tinting in white) to the product obtained without the use of oxidized rosin soap, and is equal in this respect to the ordinary commercial calcium lithol rubine toner.

I claim:

1. In a process of preparing azo lakes and pigments the step of developing an aqueous suspension of an azo coloring compound in the presence of an insoluble salt of a oxidized rosin compound.

2. In a process of preparing azo lakes and pigments the step of developing by heating an alkaline, aqueous suspension of an insoluble azo coloring compound and an insoluble salt of an oxidized rosin.

3. A lake or pigment comprising an azo coloring compound combined with a substratum comprising an insoluble salt of an oxidized rosin.

4. A lake or pigment comprising a water insoluble azo coloring compound combined with a substratum comprising a water insoluble salt of an oxidized rosin.

5. A lake or pigment comprising an alkaline earth metal salt of the azo compound obtained by coupling diazotized 2-naphthylamine 1-sulfonic acid with beta naphthol combined with a substantial amount of a substratum comprising an alkaline earth metal salt of an oxidized rosin.

6. A lake or pigment comprising an alkaline earth metal salt of the azo compound obtained by coupling diazotized para-toluidine metasulfonic acid with beta oxynaphthoic acid, combined with a substratum comprising an alkaline earth metal salt of an oxidized rosin.

ALFRED SIEGEL.

CERTIFICATE OF CORRECTION.

Patent No. 2,013,074.  September 3, 1935.

ALFRED SIEGEL.

It is hereby certified that error appears in the printed specification of the above numbered patent requiring correction as follows: Page 3, first column, after line 41, insert the words added to a solution of 6.5 parts of caustic soda; and that the said Letters Patent should be read with this correction therein that the same may conform to the record of the case in the Patent Office.

Signed and sealed this 12th day of November, A. D. 1935.

Leslie Frazer

Acting Commissioner of Patents.

(Seal)